Figure 1:
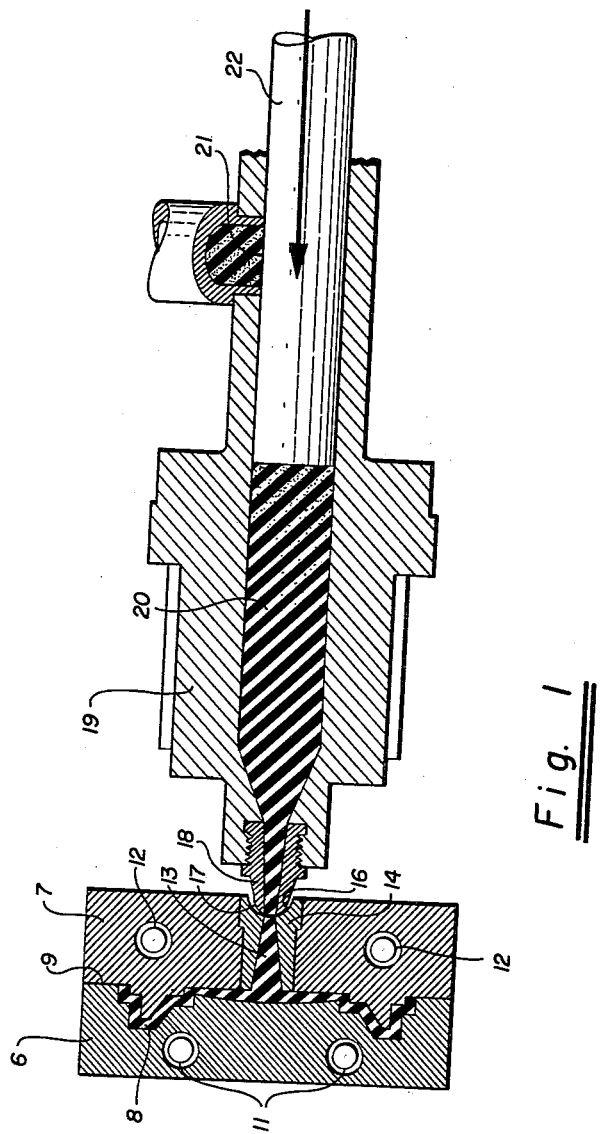

Oct. 15, 1963

H. T. STEWART 3,107,234

METHOD OF MANUFACTURE OF SILICONE RUBBER

Filed Oct. 10, 1960

2 Sheets-Sheet 1

INVENTOR.
Hugh T. Stewart
BY
Attorney

United States Patent Office 3,107,234
Patented Oct. 15, 1963

3,107,234
METHOD OF MANUFACTURE OF SILICONE RUBBER
Hugh T. Stewart, 16040 West Road, Los Gatos, Calif.
Filed Oct. 10, 1960, Ser. No. 61,750
6 Claims. (Cl. 260—46.5)

This invention relates to the manufacture of silicone rubbers.

This application is a continuation-in-part of my co-pending application Serial Number 702,273, now abandoned, filed December 12, 1957.

Silicone rubbers are elastomeric polysiloxanes in which the monomer groups repeat themselves and are joined together to form long chain molecules consisting basically of Si—O i.e., one silicon atom and one oxygen atom, and with two univalent hydrocarbon radicals attached to the silicon. In the early work with silicon rubber, and to a great extent as of today, these hydrocarbon radicals were generally the methyl group (—$CH_3$) and such material is referred to as dimethyl polysiloxane. It has the following recurring structure:

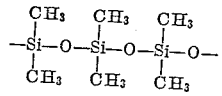

Thus, in the Patents No. 2,709,161 to Kilbourne and No. 2,816,089 to Willis, filed in 1952 and 1955, respectively, it will be noted that in all of the examples given the raw gum material which was vulcanized was dimethyl polysiloxane. In fact, at the time the later of these two patents was filed (Willis in March 1955), a polysiloxane having a vinyl constituent in the molecule had not become available from those companies which manufacture raw polysiloxane gums for use in the trade. In an article written by F. L. Kilbourne, Jr., A. S. Kidwell, and T. S. Moroney of the Connecticut Hard Rubber Company, and bearing the publication date May 1957, entitled "Selecting Silicone Rubbers," the commercially available polysiloxane gums are listed as dimethyl (General Electric Company), methyl phenyl (General Electric Company), methyl trifluoro (Dow Corning Company), methyl vinyl (General Electric Company) and methyl phenyl vinyl (General Electric Company). And a paper entitled "Properties and Uses of a New Vinyl-Containing Silicone Rubber," bearing the date May 16, 1956, which was prepared by the Development Laboratories of Union Carbide and Carbon Corporation and presented before the Rubber Division of the American Chemical Society, indicates that as of the spring of 1956, a vinyl-containing polysiloxane was relatively new.

In contradistinction to polysiloxanes which can be cured to produce elastomeric material, known as silicone rubber, polysiloxanes in which the silicon atom is attached to additional oxygens form other types of materials. Silicone resins, for example, have three instead of two oxygen atoms attached to the silicon atom, thus having room for only one hydrocarbon radical in each recurring Si—O group; and sand or quartz is a polysiloxane with four oxygen atoms attached to each silicon atom.

It is common practice that for the production of the elastomeric product, more than 98% of the silicon atoms have two hydrocarbon radicals bonded to them. In those polysiloxane rubber gum materials which contain other hydrocarbon radicals along with the methyl radicals, such as vinyl, phenyl, etc., the said other radicals are substituted for some of the methyl radicals that constitute the dimethyl polysiloxane above described. In order that the elastomeric character of the silicone rubber product may be retained, the extent of such substitution is small—in some instances one substitution on about every 1000 silicon atoms present in the molecule. The authorities and references from among the commercial suppliers of raw silicone gum for fabrication into rubber products are in agreement that in the case of phenyl groups the substitution is in the range of 5.0 to 10.0 percent of methyl groups in the molecule and in the case of vinyl substitution it ranges from 0.5 to 1.0 percent. The phenyl substitution is believed to impart resistance to low temperature stiffness, rigidity and embrittlement of the vulcanized polysiloxane. Methyl phenyl vinyl polysiloxanes are also available. In fact, this and the methyl vinyl gum above referred to are the only two vinyl-containing polysiloxanes that are at this time commercially available for the production of the elastomeric product. In the methyl phenyl vinyl material the substitutions for methyl are in the amounts just above given.

Throughout the specification and claims of this application, the term "silicone rubber," whenever used, is understood to designate an elastomeric product produced by the vulcanization of polysiloxanes, such as those hereinabove referred to. It is a term well recognized and regularly used throughout the trade to designate such product, and is in contradistinction to the term "silicone resin," which latter term is well recognized as designating rigid, non-elastomeric product made from certain polysiloxanes. The term "silicone rubber gum" is regularly used throughout the trade to designate those polysiloxanes (with or without a filler material) which are vulcanizable to form the elastomeric product; and when used in this specification and in the appended claims is understood to designate such material.

The raw or uncured vulcanizable silicon rubber gum has a consistency of stiff jelly but will not support itself. To obtain the elastomeric product, i.e., the silicone rubber, the raw gum is first compounded with certain filler material, hereinafter discussed. A curing agent is also mixed into the raw gum. Standard rubber equipment is generally used in compounding the raw gum. Normally, the filler is mixed into the gum prior to the addition of the catalyst so as to prevent any premature curing of the gum on the mill. The compounded material is then subjected to heat in one manner or another to give the final product, a mold being used in the curing step to form the final rubber product into its desired shape. Temperatures employed in the mold as heretofore practiced have generally been not above 300° F., and the material has been held in the mold for more or less prolonged periods of time. It has also invariably been the practice in these methods as heretofore employed to subject the material undergoing curing to a prolonged oven-heating post-curing period. Willis, for example, in Patent 2,816,089 hereinabove referred to, kept the material in the mold for one hour at from 275° F. to 350° F. and then oven-cured for from 4 to 48 hours at around 350° F.; and Kilbourne, in the process of his Patent 2,709,161 above referred to, mold-cured for from 15 to 30 minutes at 225° F. to 275° F. and followed this with an oven cure for from 1 to 48 hours at 300° F. to 480° F.

Curing catalysts or agents have generally included certain organic peroxides, such as benzoyl peroxide, which is that used in the process of the aforesaid Kilbourne patent, and dicumyl peroxide, which is the agent used in the process of the aforesaid Willis patent.

Filler material is required in order to obtain desired hardness and other physical properties in the final product. While a pure silicone gum can be cured, the product is too weak for all practical purposes. By changing the type and quantity of filler employed in the compound, variations in most physical properties are obtained, and sometimes in chemical and electrical properties and processing characteristics. Fillers are generally grouped into two classes: reinforcing fillers, with which it is possible to make relatively high strength silicone rubbers, i.e., they increase the tensile strength, hardness, etc.; and semi- or non-reinforcing fillers, with which other properties are obtained with only moderate strength. They are inorganic and of three major types, namely, manufactured silicas, naturally occurring silicas and metallic oxides, such as oxides of zinc, iron and titanium. The greatest reinforcement is obtained with the manufactured silicas. Included in this type, for example, is the Hi-Sil X303 referred to in the examples of the aforesaid Willis patent and stated by Willis to be a silica aerogel supplied by the Pittsburgh Plate Glass Company. The metallic oxides produce little or no reinforcement and are used primarily as an extender. The naturally occurring silicas, such as diatomaceous earth, are classified as semi-reinforcing fillers. The difference in physical properties imparted to silicone rubbers by different fillers supplied by the trade is shown by typical tensile strengths published in a Silicone Rubber Handbook put out by General Electric Company. Among the reinforcing fillers, a precipitated silica of one supplier is listed as giving a tensile strength of 600–900; that for a silica aerogel of another supplier, 600–900; for a fumed silica by another supplier, 600–1200; and for a coated silica of still another supplier, 1000–1200. Among the various semi-reinforcing and non-reinforcing fillers of different suppliers a tensile strength range of 400–800 is given for a calcined diatomaceous silica; 400–800 for a calcined kaolin; 100–400 for ground silicas of different suppliers; 200–500 for zinc oxide, iron oxide and titanium oxide supplied to the trade; and 400–600 for a zirconium silicate as supplied to the trade.

While the use of a filler is required to give certain desired properties to the elastomeric product, ustieseо sired properties to the elastomeric product, its use is not an essential element in practicing my invention. A silicone rubber part can be made by practicing the invention without the use of a filler, just as it can in other methods of curing the raw pure gum. The end product would, however, be a fully cured, but quite soft and extensible part; i.e., whereas it could be stretched, it would not completely return to its shape before having been stretched.

It is an object of my invention to provide a cured silicone rubber having the improved physical properties required of rubber parts for industrial use, which include, more specifically, greater Shore hardness, tensile strength, elongation, and less compression set, without the use of any oven post-curing period following the mold set.

Another object is to provide for the production of a cured silicone rubber part by injection molding technique in which the entire curing step takes place in a matter of seconds, thereby permitting curing and molding steps for the production of a succession of parts, to take place as rapidly as the molding apparatus can be closed and opened for the charging of the raw gum and the removal of the cured parts.

Still another object is to accomplish the molding of silicone rubber parts which require a high degree of precision of shape and dimensions, with a shrinkage factor during molding substantially as low as that which exists with organic rubbers, thereby rendering it unnecessary to provide molds which are considerably oversize as has heretofore been the practice. Organic rubbers have a lineal shrinkage in the range of 1.5 to 2.5 percent; whereas, with silicone rubber gums, as heretofore molded, the shrinkage is in the range of 5 to 7 percent, thereby presenting a particularly acute problem where precision of shape and dimensions is important, and necessitating the providing of oversized molds where undersize in the molded part cannot be tolerated.

These and other objects and advantages I accomplish through the use of a vinyl-containing polysiloxane gum, using as the catalyst a dicumyl peroxide as hereinafter described and in accordance with the present invention as hereinafter described.

My experimentation with polysiloxanes having the vinyl substitution for certain of the methyl groups as hereinabove described, and with those that are not vinyl-containing, as for example, the straight dimethyl polysiloxanes, has strongly indicated that there is a substantial difference in the behavior of the two classes during the curing of the raw gum. For example, with the dimethyl gum, and using first benzoyl peroxide and then dicumyl peroxide as the curing catalyst, I find that by increasing the quantity of catalyst at a given temperature and for the same elapsed time, the amount of cure is increased by increasing the amount of either catalyst. On the other hand, with vinyl-containing gums I do not increase the extent of cure with either catalyst at a given temperature and for the same elapsed time, by increasing the amount of catalyst. Whatever may be the real or complete reason for this difference, I am of the belief that a contributing factor is that with the dimethyl gums having no substituted vinyl radicals the curing brought about is by the formation of dimethylene crosslinks, there being but one crosslink formed for each mole of peroxide decomposed; hence, the greater the amount of either catalyst, the greater the number of dimethylene crosslinks formed and the tighter the cure. On the other hand, vinyl-containing gums cure by a chain reaction, in other words, by polymerization brought about by the catalytic action of peroxide fragments, with the double bonds present in the vinyl radical.

This fact of an inherent difference between the behavior of vinyl-containing gums and that of other polysiloxane gums is emphasized by a statement in the paper hereinabove referred to entitled "Properties and Uses of a New Vinyl-Containing Silicone Rubber," prepared by Union Carbide and Carbon's laboratory. The authors of that paper were dealing with ditertiary butyl peroxide for the curing of a vinyl-containing gum, and they stated that that catalyst "can only be used with vinyl-containing gums because it crosslinks only where vinyl groups are present and thus an excess of this catalyst has no effect on the compound's hardness or other physical properties."

The dicumyl peroxides which I employ as the catalyst in curing the vinyl-containing gums are referred to in the Willis Patent 2,816,089, hereinabove referred to, as di(aralkyl) peroxides, and are therein described as having the structural formula:

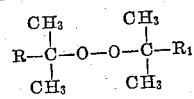

where R is phenyl and $R_1$ is selected from the group consisting of phenyl and methylphenyl. As is stated in this Willis patent, these peroxides can be prepared by methods known in the art, a particularly convenient method for preparing them involving the condensation of cumene hydroperoxide and an alcohol having the general formula:

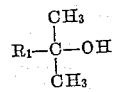

where $R_1$ is the same as in the general formula given above for these peroxides. Two of the dicumyl peroxides particularly useful for curing the vinyl-containing polysiloxane gums are bis (α,α-dimethylbenzyl)-peroxide and α,α-dimethylbenzyl (α,α-dimethyl-p-methylbenzyl) peroxide.

My experiments have shown that the dicumyl peroxides provide a unique curing combination with the vinyl-containing polysiloxane gums as outlined herein. These catalysts decompose to give only minor amounts of deleterious, volatile by-products which escape from the gum during the curing, thereby giving not only better control over the cure, but producing more stable cured rubber. This is in contrast to benzoyl peroxide, which gives the by-product benzoic acid, which remains in the cured product and affects the rubber adversely. Moreover, above 250° F., benzoyl peroxide decomposes rapidly, producing $CO_2$ in such quantity that it cannot escape and hence becomes entrapped in the curing gum to give it a sponge-like character. Conventional curing with benzoyl peroxide at below 250° F. would require an exceedingly long time, as contrasted with the substantially instantaneous curing provided by the present invention.

The proportion of the dicumyl peroxide is pertinent but not critical. My process may be practiced with varying amounts of these catalysts ranging from about 0.1% to 1.0% by weight of the uncured stock, which includes the raw polysiloxane gum plus any filler mixed therein. Relatively larger amounts of the catalyst may be used. Generally, however, I have found that the minimum amount of catalyst which will produce a satisfactory cure will likely give the best end product. With the bis ($\alpha,\alpha$-dimethylbenzoyl) peroxide, I have noted that evolution of gas, indicating decomposition, begins at around 309° F. I employ a molding temperature in the range of about 400° F. to 450° F. At these temperatures the dicumyl peroxides have a half life of between 1 to 3 seconds, and in accordance with the present invention I find that within this short period of time the vinyl-containing polysiloxane gum as above characterized becomes fully cured. The catalyst decomposes with an exothermic reaction, and because it gives off a substantial amount of heat as it decomposes, it is necessary to limit the content of dicumyl peroxide in order to prevent burning of the rubber product during the curing operation. I have found that under ordinary circumstances not more 1.0% or less, by weight of the stock to be cured, has been required, and in many instances as low as 0.1% of the dicumyl peroxide is all that is required to fully and completely and substantially instantaneously cure the molded part in accordance with the present invention.

It will be seen that with this extraordinarily fast curing, which is practically instantaneous, the curing operation is much faster than could be normally obtained in the handling of the rubber parts in ordinary compression molding technique. For this reason, and as an important feature of the present invention, the uncured gum is charged into a closed mold in an injection molding machine, which said mold is a substantially closed mold heated at the aforesaid temperature (400° F.–450° F.) where the part is formed under pressure and virtually instantaneous curing results. The molding process may be repeated or cycled as fast as the injection molding machine can be cycled, i.e., taken through the steps of closing the mold, injecting the plastic gum into the mold cavity, curing, opening the mold and removing the molded rubber part. The complete cycle from closing to closing of the mold under the best operating conditions is about 5 seconds, with ordinary economic production running at about 25 seconds per cycle.

A typical injection molding machine suitable for carrying out my process is illustrated in FIG. 1 of the drawings. The mold consists of two halves or sections 6 and 7 which cooperatively form an internal mold cavity 8 in which the part is formed. These two sections 6 and 7 are clamped together by a suitable hydraulic press or toggle clamp (not shown) and have mating surfaces which define a part line 9 between the sections in the closed position of the mold. In order to obtain evacuation of the normal air content in the closed cavity 8 upon injection of the material for molding, the part line or mating surfaces 9 are formed with very small air exit openings, such as by placing scratch lines on the mating surfaces. These air discharge openings are too small to permit the escape of the silicone rubber compound but are sufficiently large to permit air evacuation of the cavity 8 under the injection pressure which takes place in charging the mold.

The mold sections 6 and 7 are heated to a constant temperautre by any of the well known means in the art such as electrical heating elements or steam. In the illustration here shown electrical heating elements 11 are mounted in the mold section 6 and electric heating elements 12 are mounted in the mold section 7. These are preferably thermostatically controlled so as to maintain the sections at a substantially constant temperature of between 400° F. and 450° F., preferably at about the middle of this range.

The green rubber compound is charged into the mold cavity 8 through a sprue opening 13 formed in an adaptor piece 14 which is set into the section 7. The adaptor piece 14 is formed at an exterior side with a concave nozzle bearing surface 16 which is adapted to receive, in tightly sealed engagement, the convex end 17 of nozzle 18 which is fitted in the end of the injection cylinder 19. Preferably, the radius of curvature on nozzle end 17 is somewhat smaller than the radius of curvature of bearing surface 16 so that a minimum surface area contact is obtained between the parts in order to minimize the transmission of heat from the heated mold to the injection cylinder 19 which, in accordance with the present process, is constantly maintained well below the vulcanizing temperature of the green rubber compound.

The injection cylinder 19 is formed with an internal bore 20 adapted to receive the green rubber stock through a side entrance opening 21 and also carries an axially reciprocating ram 22 which moves across opening 21 so as to confine and compress the green rubber stock in the bore 20 for ejection out of the head end of the cylinder connected to the nozzle 18.

The green rubber stock to be molded may be kneaded or compounded on a conventional rubber mixing mill or roll or an internal mixer and is preferably removed as a sheet or blanket or slab and cut into strips of convenient size for handling and insertion into the bore 20 through opening 21. The standard two-roll rubber mixing mill which functions to knead rubber compounds in the bite between a pair of parallel set rollers driven at a differential speed is quite satisfactory for present purposes. The strip of green rubber may be manually inserted through opening 21 when the ram 22 is in a retracted position; and as the ram moves forward in bore 20, the green rubber stock will be injected at a very high velocity as a thin stream or rod or pencil or spaghetti as sometimes called, through the nozzle 18 and sprue opening 13 into the mold cavity 8. The pressure on ram 22 will depend upon the plasticity of the green rubber compound. For example, the ram 22 may develop from 15,000 to 20,000 lbs. per square inch pressure in the cylinder 19. In running harder stocks, that is, stocks of high viscosity, pressures in the injection cylinder may go much higher—up to, say, 100,000 lbs. per square inch. As an indication of molding and production speed, it is estimated that the stream of green rubber compound sent through nozzle 18 and into the molding cavity 8 travels at the rate of approximately 30 miles per hour, or 44 feet per second.

The foregoing injection speed is important in insuring the filling of the mold cavity 8 prior to curing of the rubber compound since, otherwise, partially or fully cured material would clog the passages and, of course, result in an imperfect non-filled part.

As stated hereinabove, my invention will cure the green rubber compound at about the speed that it takes to get the heat through the part in the molding chamber, that is, to bring this part up to about 400° F. to 450° F. In other words, a thin part will mold virtually instantly in, say, a fraction of a second. As the thickness of the part is increased, the molding time lengthens because of the thermal insulation properties of the silicone rubber compound. For example, a one-eighth inch section of green silicone rubber compound may be cured by conventional compression molding technique in ten minutes—this being the standard which has been generally set by the industry. By way of comparison, a one-eighth inch section may be fully cured by the process of the present invention in about five seconds. Actually, as stated hereinabove, it has been found that it takes about 20 to 30 seconds to cycle the injection molding machine, that is, to take it through the several steps of opening and closing the mold, removal of the molded part, and charging the injection cylinder as required. This normal rapid cycling of the machine affords a somewhat longer curing time, which is not deleterious and which permits the molding of somewhat larger sections than the one-eighth inch standard section discussed. When the mold is opened, the molded part and its attached sprue break from the material stream at the nozzle opening near the cure line. In other words, the material in the nozzle remains uncured and breaks easily at or near the point of engagement of the nozzle and the adaptor bearing surface.

My molding system differs from the conventional plastic injection molding system in that the green rubber compound in my process is not heated in the injection cylinder. In the conventional injection molding machine, the granular molding material which is fed into the machine from a hopper is converted to a softened plastic form by means of heat in the injection cylinder, and the hot plastic mass is then injected under pressure into a closed but cooled mold where it is hardened by cooling in the mold.

Figure 2:
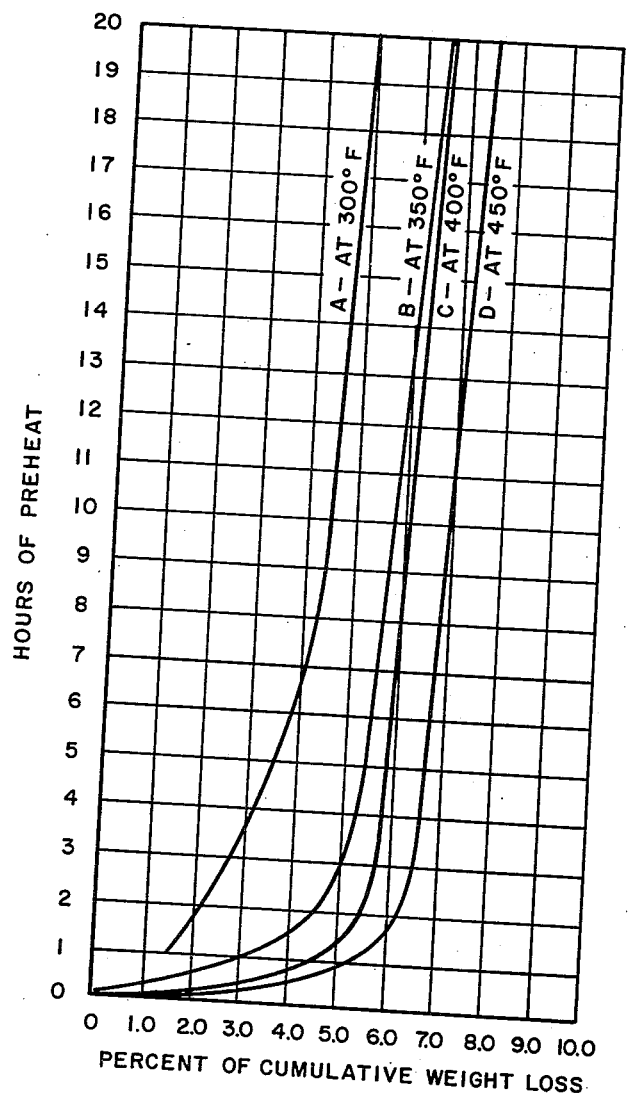

In certain instances, such as where high precision in shape and dimension of the molded parts is required, making it desirable to avoid shrinkage during the molding, I may subject the raw gum into which the desired filler has been mixed, but prior to the mixing in of the catalyst, to a preheating period at a temperature in the range upwardly from around 375° F. to 500° F., preferably at around 450° F. This preheating converts to gaseous products, thereby permitting their escape from the gum, certain unpolymerized monomeric constituents which, if allowed to remain in the gum until the curing step, would give rise to substantial shrinkage of the material from the mold, a lineal shrinkage in the range of from 5 to 7 percent sometimes resulting. While the ideal amount of preheating is that which will drive out all such gaseous matter, so that the weight of the gum, or the gum plus any filler therein, as the case may be, becomes stable under further heating, I have found that by preheating in the range of the foregoing high temperatures for a period of around 4 or 5 hours, the weight of the mass becomes substantially stable for general use in the fabrication of molded parts. Where extreme precision in shape and dimensions is required, the preheating may be carried further. My preheating is at a very much higher temperature and for a longer period, than has been employed in the prior art. For example, Kilbourne, in Patent 2,709,161 hereinabove referred to, conducted a very mild preheating—one hour at 350° F.—his primary object being to thin, i.e., to plasticize, the mix so as to increase the homogeneity and close contact, i.e., surface wetting, of the pigment (filler) particles by the rubber before the curing agent is added, other possible beneficial effects, including the possibility of reducing shrinkage, that might come from such mild preheating, being incidental. The vast difference between the approach toward a stabilized weight (essential for the solving of the shrinkage problem) accomplished by the mild preheating of the prior art and that obtained by my high temperature preheating is seen from the curves shown in FIG. 2 of the drawings where the percent of cumulative weight loss obtained during the preheating of a methyl vinyl polysiloxane vulcanizable gum containing less than one percent of vinyl substitution for methyl radicals is plotted against duration, in hours, of the preheating—curve A for 300° F., curve B for 350° F., curve C for 400° F., and curve D for 450° F. It will be seen that with the one hour of preheat at 300° F. as practiced in the said Kilbourne patent, practically no start whatever toward obtaining a stabilized weight is accomplished, the weight loss being only 1.5%. It will also be seen that at the higher preheat temperatures employed in my process, substantially all weight loss is obtained in the first few hours, the number of hours becoming fewer with the higher temperatures, there being but little loss in weight after the first four or five hours with a preheat at 450° F. With my high degree of preheat, the linear shrinkage during molding becomes substantially as low as that obtained with organic rubbers—of the order of 1.5 to 1.8% or thereabouts. Where shrinkage is not a factor to be concerned about, such as in the molding of some parts for rough work, preheating may, if desired, be omitted. My invention may be practiced either with or without it. It has now become the practice of some suppliers of raw gum to preheat it before putting it out to the molding trade.

The following examples are presented showing results obtained in the practice of my invention. The vinyl-containing, vulcanizable polysiloxane raw or uncured gums of these examples were those regularly sold to the trade for the production therefrom of silicone rubber. These gums, as supplied, have various fillers already mixed therein. The suppliers do not regularly publish the kind and amount of filler contained in the gum, but they state the shore hardness and other physical properties for which the gums with their mixed fillers are designed when vulcanized or fully cured. In the examples herewith given, this shore hardness rating by the supplier is given. Similarly, the suppliers of these gums do not give the amount of substitution of vinyl or phenyl vinyl radicals for methyl radicals in the gums they supply; but, as hereinabove stated, all suppliers are in agreement that in order for the gums to cure to silicone rubber—an elastomeric product—the amount of such substitution is small—on the order of 0.5 to 1.0 percent of the methyl groups for vinyl, and 5.0 to 10.0 percent for phenyl radicals. The vinyl and phenyl content of the gums of these examples is understood to be within these ranges. For purposes of comparing my results with the suppliers' ratings of the properties of cured rubber from the raw gums, my molded product was oven-cured, although oven curing is not generally a part of my process and is not necessary for the carrying out of my process. The comparative data are given in the various examples.

EXAMPLE 1

*Methyl Vinyl Polysiloxane—Supplier's Rating for Hardness of Cured Rubber From Stock Supplied, 40 Shore A*

[Catalyst: bis($\alpha,\alpha$-dimethylbenzyl)peroxide]

| | |
|---|---|
| Amount uncured stock _____gms__ | 181.00 |
| Amount catalyst, 0.60% _____gms__ | 1.09 |
| Injection mold temperature _____° F__ | 430 |
| Time held in mold _____secs__ | 30 |

Properties of product removed from mold:

| | My Process | Supplier's rating (15 min./250° F.) |
|---|---|---|
| Shore A Hardness_____ | 43 | 37 |
| Tensile Strength (p.s.i.)_____ | 1,130 | 955 |
| Elongation, percent_____ | 540 | 50 |

Properties after oven post cure for 24 hours at 480° F.:

|  | My Process | Supplier's rating |
|---|---|---|
| Shore A Hardness | 42 | 40 |
| Tensile Strength | 950 | 825 |
| Elongation, percent | 300 | 375 |
| Compression Set (22 hrs./350° F.), percent | 20 | 20 |

EXAMPLE 2

*Methyl Vinyl Polysiloxane—Supplier's Rating for Hardness of Cured Rubber From Stock Supplied, 45-55 Shore A*

[Catalyst: bis($\alpha,\alpha$-dimethylbenzyl)peroxide]

Amount uncured stock _____ gms__ 229.2
Amount catalyst, 0.50% _____ gms__ 1.15
Injection mold temperature _____ ° F__ 430
Time held in mold _____ secs__ 20

Properties of product removed from mold:

|  | My Process | Supplier's rating (15 min./250° F.) |
|---|---|---|
| Shore A Hardness | 55 | 44 |
| Tensile Strength (p.s.i.) | 980 | 980 |
| Elongation, percent | 580 | 520 |

Properties after oven post cure for 24 hours at 480° F.:

|  | My Process | Supplier's rating |
|---|---|---|
| Shore A Hardness | 51 | 53 |
| Tensile Strength | 1,020 | 1020 |
| Elongation, percent | 360 | 340 |
| Compression Set (22 hrs./350° F.), percent | 24 | 27 |

EXAMPLE 3

*Methyl Vinyl Polysiloxane—Supplier's Rating for Hardness of Cured Rubber From Stock Supplied, 80 Shore A*

[Catalyst: bis($\alpha,\alpha$-dimethylbenzyl)peroxide]

Amount uncured stock _____ gms__ 231.8
Amount catalyst, 0.10% _____ gms__ 0.23
Injection mold in temperature _____ ° F__ 430
Time held in mold _____ secs__ 25

Properties of product removed from mold:

|  | My Process | Supplier's rating (15 min./250° F.) |
|---|---|---|
| Shore A Hardness | 79 | 56 |
| Tensile Strength (p.s.i.) | 1,020 | 950 |
| Elongation, percent | 530 | 500 |

Properties after oven post cure for 24 hours at 480° F.:

|  | My Process | Supplier's rating |
|---|---|---|
| Shore A Hardness | 82 | 80 |
| Tensile Strength | 920 | 800 |
| Elongation, percent | 230 | 225 |
| Compression Set (22 hrs./350° F.), percent | 27 | 30 |

EXAMPLE 4

*Methyl Phenyl Vinyl Polysiloxane—Supplier's Rating for Hardness of Cured Rubber From Stock Supplied, 60 Shore A*

[Catalyst: bis($\alpha,\alpha$-dimethylbenzyl)peroxide]

Amount uncured stock _____ gms__ 226.0
Amount catalyst, 0.20% _____ gms__ 0.45
Injection mold temperature _____ ° F__ 430
Time held in mold _____ secs__ 25

Properties of product removed from mold:

|  | My Process | Supplier's rating (15 min./250° F.) |
|---|---|---|
| Shore A Hardness | 48 | 48 |
| Tensile Strength (p.s.i.) | 1,560 | 1,600 |
| Elongation, percent | 600 | 600 |

Properties after oven post cure for 24 hours at 480° F.:

|  | My Process | Supplier's rating |
|---|---|---|
| Shore A Hardness | 60 | 58 |
| Tensile Strength | 1,420 | 1,000 |
| Elongation, percent | 420 | 450 |
| Composition Set (22 hrs./350° F.), percent | 20 | 24 |

EXAMPLE 5

*Methyl Vinyl Polysiloxane—Supplier's Rating for Hardness of Cured Rubber From Stock Supplied, 70 Shore A*

[Catalyst: $\alpha,\alpha$-dimethylbenzyl($\alpha,\alpha$-dimethyl-p-methylbenzyl)peroxide]

Amount uncured stock _____ gms__ 228.3
Amount catalyst, 0.20% _____ gms__ 0.46
Injection mold temperature _____ ° F__ 430
Time held in mold _____ secs__ 30

Properties of product removed from mold:

|  | My Process | Supplier's Rating (15 min./250° F.) |
|---|---|---|
| Shore A Hardness | 69 | 70 |
| Tensile Strength (p.s.i.) | 930 | 900 |
| Elongation, percent | 120 | 90 |

Properties after oven post cure for 24 hours at 480° F.:

|  | My Process | Supplier's Rating |
|---|---|---|
| Shore A Hardness | 73 | 70 |
| Tensile Strength | 790 | 800 |
| Elongation, percent | 100 | 90 |
| Compression Set (22 hrs./350° F.), percent | 26 | 30 |

EXAMPLE 6

*Methyl Phenyl Vinyl Polysiloxane—Supplier's Rating for Hardness of Cured Rubber From Stock Supplied, 50 Shore A*

[Catalyst: $\alpha,\alpha$-dimethylbenzyl($\alpha,\alpha$-dimethyl-p-methylbenzyl)peroxide]

Amount uncured stock _____ gms__ 224.2
Amount catalyst, 0.20% _____ gms__ 0.45
Injection mold temperature _____ ° F__ 430
Time held in mold _____ secs__ 25

Properties of product removed from mold:

|  | My Process | Supplier's Rating (15 min./250° F.) |
| --- | --- | --- |
| Shore A Hardness | 52 | 48 |
| Tensile Strength (p.s.i.) | 1,020 | 900 |
| Elongation, percent | 470 | 450 |

Properties after oven post cure for 24 hours at 480° F.:

|  | My Process | Supplier's Rating |
| --- | --- | --- |
| Shore A Hardness | 54 | 52 |
| Tensile Strength | 1,150 | 1,100 |
| Elongation, percent | 400 | 400 |
| Compression Set (22 hrs./350° F.), percent | 15 | 15 |

EXAMPLE 7

| Methyl vinyl polysiloxane | parts/wt | 100.0 |
| Fumed silica | do | 50.0 |
| Bis(α,α-dimethyl)peroxide) | do | 0.04 |
| Injection mold temperature | ° F | 425 |
| Time held in mold | secs | 30 |

Properties of product removed from mold:

|  | My Process | Supplier's Rating (10 min./250° F. with 2,4-dichlor benzoyl peroxide 2.00 parts/wt.) |
| --- | --- | --- |
| Shore A Hardness | 52 | 50 |
| Tensile Strength (p.s.i.) | 1,020 | 900 |
| Elongation, percent | 330 | 300 |
| Compression Set (22 hrs./350° F.), percent | 25 | 30 |

EXAMPLE 8

| Methyl phenyl vinyl polysiloxane | parts/wt | 100.0 |
| Silica aerogel | do | 40.0 |
| Calcined diatomaceous earth | do | 20.0 |
| Iron oxide | do | 1.0 |
| α,α-Dimethylbenzyl(α,α-dimethyl-p-methylbenzyl) peroxide | parts/wt | 0.40 |
| Injection mold temperature | ° F | 430 |
| Time held in mold | secs | 40 |

Properties of product removed from mold:

|  | My Process | Supplier's Rating (20 min./340° F. with ditertiary butyl peroxide 2.00 parts/wt.) |
| --- | --- | --- |
| Shore A Hardness | 65 | 65 |
| Tensile Strength (p.s.i.) | 960 | 850 |
| Elongation, percent | 270 | 240 |
| Compression Set (22 hrs./350° F.) | 37 | 40 |

In the following examples the raw gum stock was preheated and then cooled to room temperature before mixing in the catalyst:

EXAMPLE 9

*Methyl Vinyl Polysiloxane—Supplier's Rating for Hardness of Cured Rubber From Stock Supplied, 40 Shore A*

[Catalyst: α,α-dimethylbenzyl(α,α-dimethyl-p-methylbenzyl)peroxide]

| Weight before preheating | gms | 250.0 |
| Weight after 4 hrs./450° F | gms | 227.9 |
| Loss during preheating | gms | 22.1 |
|  | percent | 8.84 |
| Amount of catalyst, 0.10% | gms | 0.23 |
| Injection mold temperature | ° F | 430 |
| Time held in mold | secs | 25 |

Properties of product removed from mold:

|  | My Process | Supplier's rating (15 min./250° F.) |
| --- | --- | --- |
| Shore A Hardness | 39 | 37 |
| Tensile Strength (p.s.i.) | 1,090 | 950 |
| Elongation, percent | 540 | 500 |
| Linear Shrinkage | 1.8 | |

Properties after oven post cure for 24 hours at 480° F.:

|  | My Process | Supplier's rating (15 min./250° F.) |
| --- | --- | --- |
| Shore A Hardness | 42 | 40 |
| Tensile Strength | 920 | 825 |
| Elongation, percent | 300 | 375 |
| Compression Set (22 hrs./350° F.), percent | 17 | 20 |
| Linear shrinkage | 1.8 | |

EXAMPLE 10

*Methyl Phenyl Vinyl Polysiloxane—Supplier's Rating for Hardness of Cured Rubber From Stock Supplied, 60 Shore A*

[Catalyst: bis(α,α-dimethylbenzyl)peroxide]

| Weight before preheating | gms | 250.0 |
| Weight after 8 hrs./500° F | gms | 235.0 |
| Loss during preheat | gms | 15.0 |
|  | percent | 6 |
| Amount catalyst, 1.0% | gms | 2.35 |
| Injection mold temperature | ° F | 400 |
| Time in mold | secs | 60 |

Properties of product removed from mold:

|  | My Process | Supplier's rating (10 min./250° F.) |
| --- | --- | --- |
| Shore A Hardness | 57 | 45 |
| Tensile Strength (p.s.i.) | 1,660 | 1,600 |
| Elongation, percent | 840 | 850 |
| Linear Shrinkage | 2.3 | |

Properties after oven post cure for 24 hours at 480° F.:

|  | My Process | Supplier's rating (10 min./250° F.) |
| --- | --- | --- |
| Shore A Hardness | 60 | 60 |
| Tensile Strength | 910 | 700 |
| Elongation, percent | 310 | 250 |
| Compression set (22 hrs./350° F.), percent | 42 | 60 |
| Linear Shrinkage | 2.3 | |

It will be understood that the examples given hereinabove are exemplary in nature, that various changes and modifications therein may be made without departing from the spirit of the invention, and that there is comprehended in the invention such modifications as come within the scope of the following claims.

I claim:

1. The process of making an elastomeric silicone rubber part which consists in selecting a vinyl-containing vulcanizable polysiloxane; admixing said polysiloxane with a dicumyl peroxide in an amount ranging from about 0.1% to 1.0% and having the structural formula

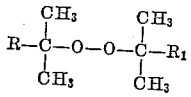

where R is phenyl and $R_1$ is selected from the group consisting of phenyl and methylphenyl, to produce a plastic mass; charging said mass at relatively high speed into a substantially closed mold pre-heated to about 375° F. to 450° F. to define a part; retaining said part in said mold for a period of time sufficient to effect cross-linking of the vinyl groups of the molecule prior to cross-linking of the methyl groups of the molecule; and opening said mold and removing said part.

2. The process of claim 1 wherein said plastic mass is charged into said mold at high speed so as to fill said mold cavity before any substantial curing or vulcanization of said mass takes place.

3. The process of claim 1 wherein said plastic mass is charged into said mold at high speed so as to fill said mold cavity before any substantial curing or vulcanization of said mass takes place, and said part is retained in said mold for a period ranging from about 5 to 30 seconds.

4. The process of making an elastomeric silicone rubber part which consists in providing a vinyl-containing vulcanizable polysiloxane; admixing therewith an inorganic filler; heating said mixture in the absence of a curing catalyst at from about 375° F. to 500° F. until its weight becomes approximately stable; cooling said mixture; admixing with said cooled mixture a dicumyl peroxide in an amount ranging from about 0.1% to 1.0% and having the structural formula

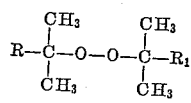

where R is phenyl and $R_1$ is selected from the group consisting of phenyl and methylphenyl, to produce a plastic mass; charging said mass at relatively high speed into a substantially closed mold pre-heated to about 375° F. to 450° F. to define a part; retaining said part in said mold for a period of time sufficient to effect cross-linking of the vinyl groups of the molecule prior to cross-linking of the methyl groups of the molecule; and opening said mold and removing said part.

5. The process of claim 1 wherein said dicumyl peroxide is bis($\alpha,\alpha$-dimethylbenzyl)peroxide.

6. The process of claim 1 wherein said dicumyl peroxide is $\alpha,\alpha$-dimethylbenzyl($\alpha,\alpha$-dimethyl-p-methylbenzyl)peroxide.

References Cited in the file of this patent
UNITED STATES PATENTS
2,816,089    Willis ---------------- Dec. 10, 1957